United States Patent
Stiebinger

(10) Patent No.: US 8,151,561 B2
(45) Date of Patent: Apr. 10, 2012

(54) MULTI-CYLINDER INTERNAL COMBUSTION ENGINE

(75) Inventor: Christian Stiebinger, Buchkirchen (AT)

(73) Assignee: MAN Truck & Bus Österreich AG (AT)

( * ) Notice: Subject to any disclaimer, the term of this patent is extended or adjusted under 35 U.S.C. 154(b) by 798 days.

(21) Appl. No.: 11/744,366

(22) Filed: May 4, 2007

(65) Prior Publication Data

US 2007/0261393 A1 Nov. 15, 2007

(30) Foreign Application Priority Data

May 5, 2006 (AT) .................................. A 774/2006

(51) Int. Cl.
*F01N 3/00* (2006.01)
*F01N 3/10* (2006.01)

(52) U.S. Cl. ................ 60/302; 60/295; 60/299; 60/301; 60/303

(58) Field of Classification Search .................... 60/285, 60/286, 299, 301, 303, 295, 297, 302; 422/170, 422/172, 182
See application file for complete search history.

(56) References Cited

U.S. PATENT DOCUMENTS

| | | | |
|---|---|---|---|
| 6,189,316 B1 | 2/2001 | Surnilla | |
| 6,568,177 B1 | 5/2003 | Surnilla | |
| 6,928,807 B2 * | 8/2005 | Jacob et al. | 60/286 |
| 2003/0213234 A1 * | 11/2003 | Funk et al. | 60/286 |
| 2006/0096275 A1 * | 5/2006 | Robel et al. | 60/286 |
| 2006/0257303 A1 * | 11/2006 | Telford | 423/239.1 |
| 2007/0074506 A1 * | 4/2007 | Driscoll et al. | 60/286 |
| 2007/0175204 A1 * | 8/2007 | Shirai et al. | 60/286 |

FOREIGN PATENT DOCUMENTS

| | | | |
|---|---|---|---|
| DE | 4203807 A1 * | 8/1993 | |
| DE | 10123359 | 11/2002 | |
| DE | 10218255 | 11/2003 | |
| EP | 487886 A1 * | 6/1992 | |
| EP | 1357267 A2 * | 10/2003 | |
| EP | 1 422 410 | 5/2004 | |
| GB | 2 389 918 | 12/2003 | |
| WO | WO 2004076829 A1 * | 9/2004 | |

OTHER PUBLICATIONS

Eberhard, English Abstract of EP 487886 A1, Jun. 3, 1992.*
Eberhard, Machine Translation of EP 487886 A1, Jun. 3, 1992.*
Jacob et al., English Abstract of DE 4203807 A1, Aug. 12, 1993.*
Jacob et al., Machine Translation of DE 4203807 A1, Aug. 12, 1993.*

* cited by examiner

*Primary Examiner* — Thomas Denion
*Assistant Examiner* — Audrey K Bradley
(74) *Attorney, Agent, or Firm* — Robert W. Becker; Robert Becker & Associates

(57) ABSTRACT

A multi-cylinder internal combustion engine, wherein exhaust gas outlets of a first portion of the cylinders of the engine communicate with a first exhaust gas manifold section, and the exhaust gas outlets of the remaining cylinders communicate with a second exhaust gas manifold section. An oxidation catalytic converter is disposed in the first exhaust gas manifold section for converting nitric oxide into nitrogen dioxide. A hydrolysis catalytic converter is disposed in the second exhaust gas manifold section, wherein downstream of the catalytic converters the first and second exhaust gas manifold sections discharge into a common main exhaust gas manifold, in which is disposed a further catalytic converter. Upstream of the hydrolysis catalytic converter, a reduction agent can be introduced into the second exhaust gas manifold section; ammonia is adapted to be produced from the reduction agent via the hydrolysis catalytic converter.

7 Claims, 2 Drawing Sheets

MULTI-CYLINDER INTERNAL COMBUSTION ENGINE

The instant application should be granted the priority date of May 5, 2006 the filing date of the corresponding Austrian patent application A 774/2006.

BACKGROUND OF THE INVENTION

The present invention relates to a multi-cylinder internal combustion engine, especially for a commercial vehicle.

The present application proceeds from DE 103 22 963 A1, FIGS. 2A and 2C of which disclose a multi-cylinder internal combustion engine according to which the exhaust gas outlets of a portion of the cylinders communicate with a first exhaust gas manifold section, and the exhaust gas outlets of the other portion of the cylinders communicate with a second exhaust gas manifold section, whereby a catalytic converter is disposed in each of the exhaust gas manifold sections. However, this document provides no discussion regarding the type of catalytic converters that are disposed in the individual exhaust gas manifold sections. DE 101 23 359 A1 discloses in FIG. 21 and the associated text the provision of a muffler in an exhaust gas manifold, whereby a hydrolysis catalytic converter, and at least one oxidation catalytic converter, can have flow through them in parallel in the muffler. A reduction agent is metered into the inlet region of the hydrolysis catalytic converters with ammonia being produced by the reaction agent. The oxidation catalytic converter serves for the conversion of NO into $NO_2$. This type of parallel flow through the two catalytic converters, proceeding from a common exhaust gas intake chamber in the muffler, can lead to undesired non-uniform flow components, which can effect either an $NO_2$ production that is too high, or a non-complete conversion of the reduction agent, accompanied by harmful separation products such as isocyanic acid or solid cyanuric acid particles.

It is therefore an object of the present application to associate an exhaust gas post treatment device with an internal combustion engine of the aforementioned general type, according to which, due to the selection and arrangement of the catalytic converters, the problems that can occur with the parallel arrangement of the catalytic converters in the muffler of DE 101 23 359 A1 are eliminated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The multi-cylinder internal combustion engine of the present application comprises an oxidation catalytic converter disposed in a first exhaust gas manifold section, wherein nitric oxide contained in the exhaust gas that flows through is adapted to be converted by the oxidation catalytic converter into nitrogen dioxide; a hydrolysis catalytic converter disposed in a second exhaust gas manifold section, wherein downstream of the oxidation and hydrolysis catalytic converters, the first and second exhaust gas manifold sections discharge into a common main exhaust gas manifold, at least one further catalytic converter disposed in the main exhaust gas manifold; and means for introducing a reduction agent into the second exhaust gas manifold section upstream of the hydrolysis catalytic converter, wherein ammonia is adapted to be produced from the reduction agent via the hydrolysis catalytic converter.

As a result of the inventive arrangement of the oxidation catalytic converter and of the hydrolysis catalytic converter in its own respective exhaust gas manifold section, each of these catalytic converters is always acted upon by a defined exhaust gas stream. Due to their arrangement separate from one another, the functionalities of the two catalytic converters do not mutually interfere with one another, but rather are fully effective. In other words, a defined exhaust gas stream flows through the oxidation catalytic converter, in which a defined quantity of the NO is converted into $NO_2$. Associated with the hydrolysis catalytic converter is a metering-in stretch defined by the pipe or conduit of the exhaust gas manifold section for the reduction agent. Downstream of the catalytic converters, the two at that point still different gas streams are joined together, are subsequently thoroughly mixed in the main exhaust gas manifold in an adequately long mixing zone, and are then conveyed through the SCR catalytic converter or converters, as well as possibly through further catalytic converters.

Further specific features of the present invention will be described in detail subsequently.

DESCRIPTION OF SPECIFIC EMBODIMENTS

Figure 1:
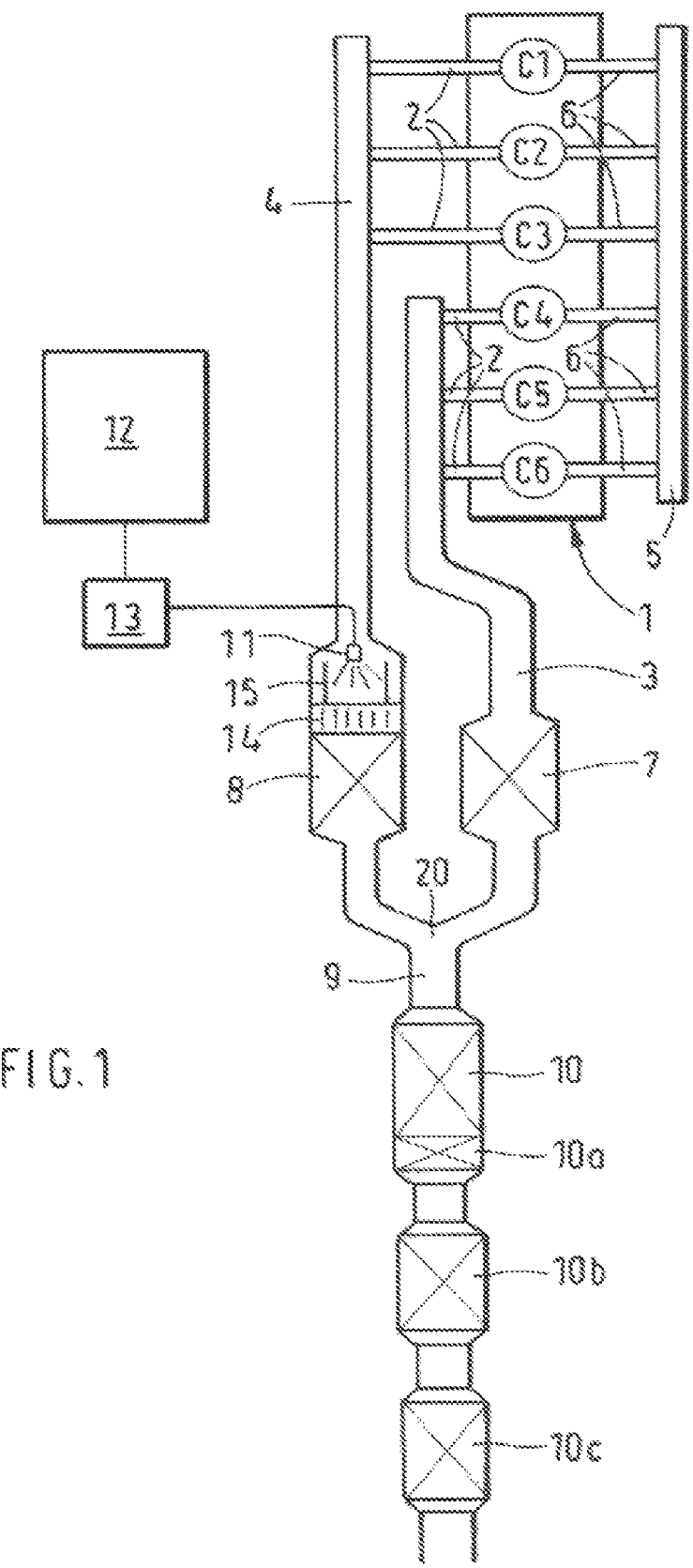
FIG. 1 shows, as a multi-cylinder internal combustion engine, a six-cylinder in-line engine pursuant to a first exemplary embodiment of an exhaust gas manifold and catalytic converter arrangement.
Figure 2:
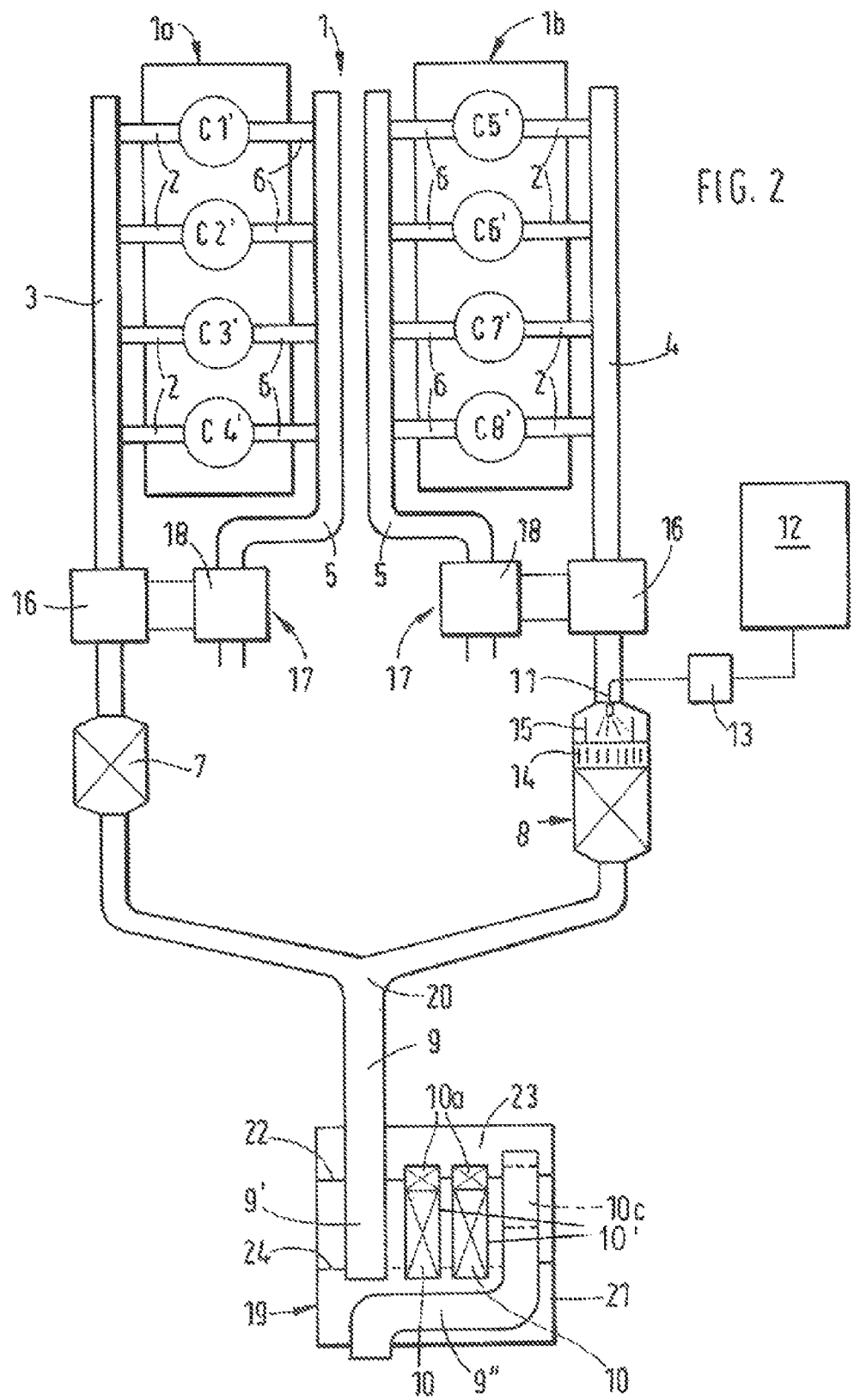
FIG. 2 shows, as a multi-cylinder internal combustion engine, an 8-cylinder V engine pursuant to a second exemplary embodiment of an inventive exhaust gas manifold and catalytic converter arrangement.

Referring now to the drawings in detail, in the figures an internal combustion engine is designated by the reference numeral 1 and serves, for example, as the drive source of a vehicle. In FIG. 1, this internal combustion engine 1 is a 6-cylinder in-line engine, the cylinders of which are designated as C1, C2, C3, C4, C5 and C6. In FIG. 2, the internal combustion engine 1 is formed by an 8-cylinder V engine, the cylinders of which are designated as C1', C2', C3', C4', C5', C6', C7' and C8', and the two banks or rows of cylinders of which are designated as 1a, 1b. The exhaust gas outlets of the cylinders are designated by the reference numeral 2. With each internal combustion engine 1, the exhaust gas outlets 2 of a portion of the cylinders (C4, C5, C6 in FIG. 1; C1', C2', C3', C4' in FIG. 2) are connected to or communicate with a first exhaust gas manifold branch or section 3, and the exhaust gas outlets 2 of the remaining cylinders (C1, C2, C3 in FIG. 1, C5', C6', C7', C8' in FIG. 2) are connected to or communicate with a second exhaust gas manifold branch or section 4. The reference numeral 5 designates a delivery or charge air line, from which the cylinders of the internal combustion engine 1 are supplied with combustion air or charge air via inlets 6. A catalyzer or catalytic converter 7 or 8 respectively is disposed in each of the two exhaust gas manifold sections 3, 4. Downstream of these catalytic converters 7, 8, the two exhaust gas manifold sections 3,4 flow or discharge into a then common main exhaust gas line or manifold 9, in which is disposed at least one further catalytic converter 10.

Pursuant to the present application the catalytic converter 7 that is disposed in the first exhaust gas manifold section 3 is formed by an oxidation catalytic converter via which the nitric oxide (NO) contained in the exhaust gas that flows through is converted into nitrogen dioxide ($NO_2$). Furthermore, the catalytic converter 8 that is disposed in the second exhaust gas manifold section 4 is formed by a hydrolysis catalytic converter, and upstream of the hydrolysis catalytic converter 8 a reduction agent can be introduced into the second exhaust gas manifold section 4, and in particular via a nozzle or jet 11 to which the required quantity of reduction agent is supplied from a supply tank 12 via a metering device 13. Ammonia can be produced from this reduction agent with the aid of the hydrolysis converter 8.

If the reduction agent is an aqueous urea solution, a flow mixer 14, and if desired also an evaporator or a heating device 15, can be disposed upstream of the hydrolysis catalytic converter 8. The flow mixer 14 serves for a thorough mixing of the metered-in reduction agent with the exhaust gas, as well as for a homogenization of the distribution of this mixture over the entire entry cross-section of the hydrolysis catalytic converter 8. The evaporator or heating device 15 serves to accelerate the evaporation of the metered-in reduction agent.

With the V engine of FIG. 2, each of the exhaust gas manifold sections 3; 4 is directed, upstream of the respective catalytic converter 7, 8, through the turbine 16 of a turbocharger 17, by means of the compressor 18 of which the charge air line 5 can be supplied with charge air.

The at least one further catalytic converter 10 in the main exhaust gas manifold 9 comprises one or more SCR(Selective Catalytic Reduction)-type catalytic converter or converters, for example ammonia ($NH_3$) suppression oxidation catalytic converter or converters 10a, particle oxidation catalytic converter or converters 10b, and nitrogen dioxide ($NO_2$) suppression catalytic converter or converters 10c.

In the embodiment illustrated in FIG. 1, these catalytic converters 10, 10a, 10b, 10c are successively disposed in series in the main exhaust gas manifold 9. In contrast, in the embodiment illustrated in FIG. 2 a muffler 19 is provided in the main exhaust gas manifold 9, wherein the catalytic converter or converters 10, 10a, 10b, 10c are installed in the muffler 19.

Each portion of the main exhaust gas manifold 9 between the junction 20 of the two exhaust gas manifold sections 3, 4 and the inlet location into the (first one of the) catalytic converter or converters 10 forms an adequately long mixing zone for the two different gas streams that are introduced into the main exhaust gas manifold 9 from the exhaust gas manifold sections 3, 4. In the embodiment of FIG. 2, a tubular piece 9' of the main exhaust gas manifold 9 is part of this mixing zone, and extends far into the interior of the muffler 19, and opens out into a downstream intake chamber 21, which in the cylindrical muffler 19 is separated from a forward discharge chamber 23 by a wall 22, Catalytic converter modules 10', through which flow can occur in parallel, are fixed in position in the muffler 19 by the wall 22, which is not permeable to gas, and a gas-permeable support wall 24. Each of these catalytic converter modules 10', in its own housing, is provided with an SCR catalytic converter 10, and downstream thereof an ammonia suppression catalytic converter 10a. From the discharge chamber 23, a final stage pipe or conduit 9' leads out of the muffler 19. In the illustrated embodiment, a nitrogen dioxide ($NO_2$) suppression catalytic converter 10c is installed in the final stage conduit 9'', and a particle oxidation catalytic converter 10b can also possibly be installed.

The specification incorporates by reference the disclosure of Austrian priority document A774/2006 filed May 5, 2006.

The present invention is, of course, in no way restricted to the specific disclosure of the specification and drawings, but also encompasses any modifications within the scope of the appended claims.

What I claim is:

1. A multi-cylinder internal combustion engine, comprising:
    a first exhaust gas manifold section (3), wherein exhaust gas outlets (2) of a first portion of the cylinders of the engine communicate only with said first exhaust gas manifold section (3);
    a second exhaust gas manifold section (4), wherein exhaust gas outlets (2) of a remaining portion of the cylinders of the engine communicate only with said second exhaust gas manifold section (4);
    an oxidation catalytic converter (7) disposed in said first exhaust gas manifold section, wherein nitric oxide contained in exhaust gas that flows through is adapted to be converted via said oxidation catalytic converter (7) into nitrogen dioxide;
    a hydrolysis catalytic converter (8) disposed in said second exhaust gas manifold section (4), wherein downstream of said oxidation catalytic converter (7) and said hydrolysis catalytic converter (8) said first and second exhaust gas manifold sections (3, 4) discharge into a common main exhaust gas manifold (9);
    at least one SCR catalytic converter (10) disposed in said main exhaust gas manifold (9); and
    means (11, 12, 13) for introducing a reduction agent into said second exhaust gas manifold section (4) upstream of said hydrolysis catalytic converter (8), wherein ammonia is adapted to be produced from said reduction agent via said hydrolysis catalytic converter,
    wherein said reduction agent is an aqueous urea solution, and wherein a flow mixer (14) is disposed upstream of said hydrolysis catalytic converter (8) in said second exhaust gas manifold section (4),
    wherein an evaporator or a heating device (15) is disposed in said second exhaust gas manifold section (4) upstream of said hydrolysis catalytic converter (8) and upstream of said flow mixer (14) for accelerating evaporation of said introduced reduction agent in said second exhaust gas manifold section (4).

2. An internal combustion engine according to claim 1, wherein said engine is a V engine, wherein the exhaust gas outlets (2) of one bank of cylinders (1a, 1b) communicate with one of said exhaust gas manifold sections (3, 4), wherein the exhaust gas outlets (2) of the other bank of cylinders (1b, 1a) communicate with the other exhaust gas manifold section (4, 3), wherein a respective turbo-charger (17) having a turbine (16) is associated with each of said exhaust gas manifold sections (3, 4), and wherein upstream of the respective oxidation catalytic converter (7) or hydrolysis catalytic converter (8) each of said exhaust gas manifold sections (3, 4) is directed through the turbine (16) of the pertaining turbocharger (17).

3. An internal combustion engine according to claim 1, wherein a portion of said main exhaust gas manifold (9) disposed between the location where said first and second exhaust gas manifold sections (3, 4) join together and an inlet location into said at least one SCR catalytic converter (10) forms an adequately long mixing zone for the two different gas streams coming from said first and second exhaust gas manifold sections.

4. An internal combustion engine according to claim 1, wherein at least one further catalytic converter is disposed in said main exhaust gas manifold (9) and is at least one of the group consisting of ammonia suppression catalytic converters (10a), particle oxidation catalytic converters (10b), and nitrogen dioxide suppression catalytic converters (10c).

5. An internal combustion engine according to claim 4, wherein a muffler (19) is disposed in said main exhaust gas manifold (9), and wherein at least said at least one SCR catalytic converter (10) is installed in said muffler (19).

6. An internal combustion engine according to claim 1, which includes a muffler (19) disposed in said main exhaust gas manifold (9) and having an intake chamber (21) and a discharge chamber (23) that are separated from one another, wherein an upstream portion (9') of said main exhaust gas manifold (9) opens out into said intake chamber (21) and a downstream portion (9") of said main exhaust gas manifold (9) leads out of said discharge chamber (23), and wherein said at least one SCR catalytic converter (10) is disposed between, and in flow communication with, said intake chamber (21) and said discharge camber (23).

7. An internal combustion chamber according to claim 6, wherein an ammonia suppression catalytic converter (10a) is disposed between said at least one SCR catalytic converter (10) and said discharge chamber (23).

\* \* \* \* \*